Dec. 18, 1951 C. TETZLAFF 2,578,860
BAND-TIGHTENING INSTRUMENTALITY FOR HOSE CLAMPS
Filed Feb. 7, 1949
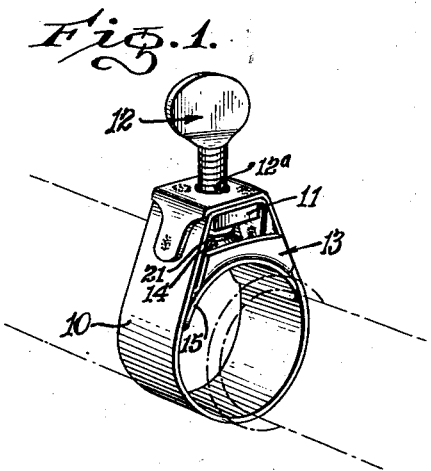
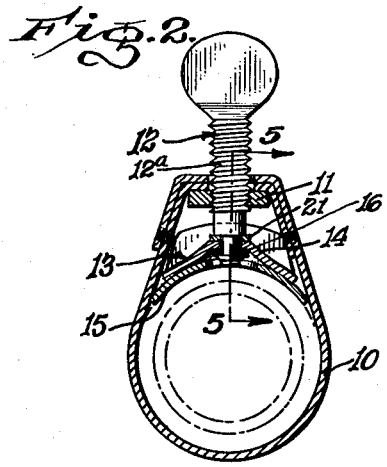
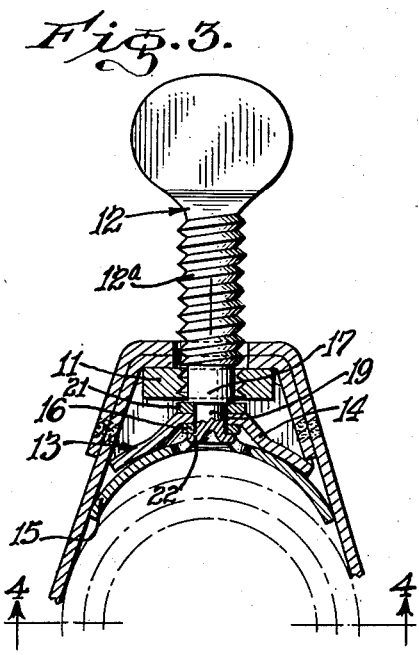
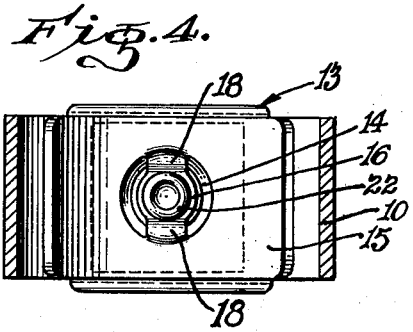
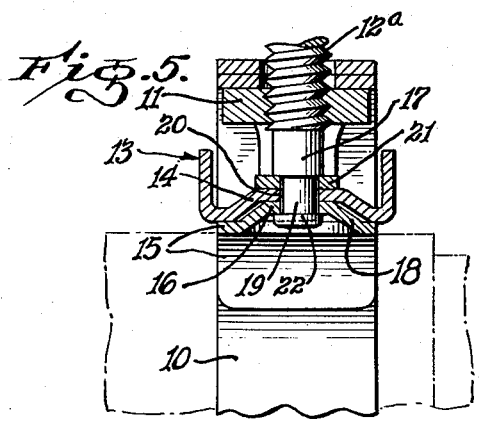
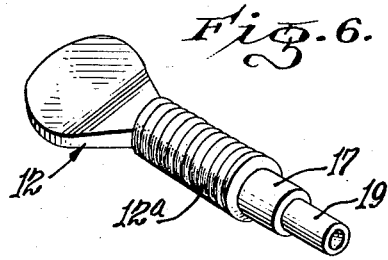
Inventor
Clarence Tetzlaff
BY
Frank J. Schraeder Jr.
Attorney.

Patented Dec. 18, 1951

2,578,860

UNITED STATES PATENT OFFICE 2,578,860

BAND-TIGHTENING INSTRUMENTALITY
FOR HOSE CLAMPS

Clarence Tetzlaff, Riverside, Ill.

Application February 7, 1949, Serial No. 75,007

1 Claim. (Cl. 24—19)

The present invention relates generally to hose clamps of the type comprising a flexible band formed into a closed loop with which a band-tightening instrumentality, consisting of a bridge device and a pressure exerting screw, cooperates to securely tighten the clamp band about a hose or the like. The invention has among its objects to provide a novel band-tightening instrumentality possessing advantages over prior devices and including a novel band-tightening screw which, when permanently assembled with the other parts of the instrumentality, cannot be accidentally detached therefrom and thereby lost and which screw due to its novel structure can be freely rotated to fully loosen the band from its engagement with the hose to permit removal of the clamp from the hose; the construction of the screw being such that the screw may be freely continued to be rotated even though the clamp band has been loosened to its maximum extent without stripping its threads or the threads of the nut in which it is mounted and without causing its detachment from its rotatable connection with an arcuate liner which cooperates with an arcuate bridge to complete the circumferential engagement of the clamp about the hose.

The present invention relates particularly to a band-tightening instrumentality which spans a gap between spaced ends of the clamp band and which includes a relatively stiff bridge and a lighter, more resilient liner, preferably substantially longer than the bridge and which liner cooperates with the bridge to complete the circumferential engagement of the clamp about the hose and to effectively distribute the pressure of the bridge over desired areas of the circumference of the hose. One of the principal objects of the present invention is to provide a simple and novel connection between the screw, bridge and liner so that these elements can function to best advantage to distribute the pressure from the screw to the bridge and liner and still afford desired resiliency and permit the clamp band to be fully loosened from the hose without detaching the screw from the liner or destroying the threaded connection between the screw and its supporting nut.

The various features of novelty whereby my invention is characterized will hereinafter be pointed out with particularity in the claims; but, for a full understanding of the invention and of its objects and advantages, reference may be had to the following detailed description taken in connection with the accompanying drawings, wherein:

Fig. 1 is a perspective view of a hose clamp embodying the present invention.

Fig. 2 is a vertical section through the clamp shown in Fig. 1 showing the clamp in tightened position.

Fig. 3 is an enlarged vertical section of the upper portion of the clamp shown in Fig. 2, but showing the band-tightening screw in loosened position.

Fig. 4 is a transverse section on line 4—4 of Fig. 3.

Fig. 5 is an enlarged vertical section of the lower end of the band-tightening screw taken on line 5—5 of Fig. 2.

Fig. 6 is a perspective view of the novel band-tightening screw.

Referring to the drawing, 10 designates any usual or suitable flexible metal band formed into a preferably closed loop by having its end portions bent to overlap each other; the overlapped portions being provided with aligned perforations and being preferably welded to a screw-threaded nut 11 positioned within the loop between outwardly converging end portions of the band. A screw 12 extends through the overlapped band portions and through the nut 11 at the long axis of the device; the lower or inner end of the screw 12 carrying gap-spanning bridge means to complete the circumferential engagement of the band between the junctures of the outwardly converging band portions with the arcuate portion of the band, together with which the screw constitutes the band-tightening instrumentality of the clamp. The screw 12 is freely movable within the large registering perforations in the overlapping band ends.

The main element of the bridge means is a relatively stiff arcuate bridge proper 13, formed of a channel-shaped metal stamping curved lengthwise, with the open side of the channel on the upper or convex side. The bridge 13 is formed with a bulge or dome-like portion 14 disposed outwardly from its convex side, located at the center of the bridge and flattened at the top thereof, to provide a chamber or recess of substantial size on the underside of the bridge and to thus structurally strengthen the bridge and transmit the pressure of the screw toward the sides and especially toward the ends of the bridge.

Nested in the bridge 13 and constituting an element of the gap-spanning bridge means is a flexible and comparatively thin resilient insert or liner 15 that may conveniently be of the same material as that employed in the clamp band; the liner 15 being longer than the bridge 13. While the bridge 13 is curved on about the same radius as the hose to which the clamp is to be applied, the liner 15 is preferably formed on a slightly shorter radius than the bridge. At the center of the liner is an outwardly disposed perforated portion or eyelet 16. In the arrangement shown, the eyelet 16 is produced by cutting and stamping the liner so as to fashion the perforated eyelet portion in an outwardly raised position by means of a pair of diametrically opposed arm elements 18 formed integral with the eyelet portion and the body of the liner.

The screw 12 is formed, at its extreme inner end, with a smooth cylindrical terminal portion 19 of reduced diameter that extends through a perforated washer 21 positioned on the bridge dome 14, and through a perforation 20 in the center of the dome 14 of the bridge 13 and through the perforation in the eyelet portion of the liner 15. The washer 21 is seated on the dome portion 14 of the bridge 13 adjacent the shoulder formed at the juncture of an intermediate smooth cylindrical portion 17 of the screw with the smooth cylindrical terminal portion 19 of reduced diameter; the free end of the latter being slightly peened to create a head 22 which prevents displacement of the screw from the bridge means but permits the screw 12 to rotate and which head 22 lies well above or outwardly from the inner face of the body portion of the liner.

As clearly shown in Figs. 2, 3, 5 and 6, the diameter of the smooth intermediate screw portion 17 is slightly greater than the diameter of the terminal portion 19 to provide the desired shoulder for the rotatable engagement of the screw with the upper or outer face of the washer 21, however, the diameter of the intermediate portion 17 is smaller than the diameter of the threaded stem portion 12ª and smaller than the diameter of the threaded hole in the nut 11 and its length is at least equal to but preferably slightly greater than the thickness of the nut 11 to permit the intermediate portion 17 to be drawn into the threaded hole of the nut 11 upon rotation of the screw to the point where the clamp band has been loosened to its maximum extent and whereat the threaded portion of the screw is completely withdrawn from its threaded connection with the nut 11 to thereafter permit the screw to be freely continuously rotated without its further axial displacement relatively to the nut 11 while it retains its rotatable connection with the gap-spanning bridge means. There is therefore no possibility of stripping the screw threads or the threads in the nut upon continued rotation of the screw after the clamp band has been loosened to its maximum point whereupon the entire clamp may then be freely removed from the hose connection in good condition free from stripped threads and thereafter re-used, if so desired, on other similar hose connections.

I claim:

In a looptype hose clamp composed of a band in the form of a closed loop, a nut fixed to the inner side of the loop, a screw passing through the band and the nut from the exterior of the loop, a member swivelled on a smooth cylindrical inner end portion of the screw to form with a portion of the band a smaller closed loop: the improvement which consists in the enlargement of the hole in the band through which the screw passes to a diameter greater than the greatest diameter of the screw, and the reduction in diameter of an intermediate smooth cylindrical portion of the screw to a size which is greater in diameter than the inner end portion of the screw on which said member is swivelled but lesser in diameter than the smallest internal diameter of the nut, the longitudinal length of the intermediate portion of the screw being at least equal to the thickness of the nut.

CLARENCE TETZLAFF.

REFERENCES CITED

The following references are of record in the file of this patent:

UNITED STATES PATENTS

| Number | Name | Date |
| --- | --- | --- |
| 1,187,430 | Kenly | June 13, 1916 |
| 2,321,930 | Murray | June 15, 1943 |
| 2,392,210 | Zaleske | Jan. 1, 1946 |

FOREIGN PATENTS

| Number | Country | Date |
| --- | --- | --- |
| 523,313 | Great Britain | July 11, 1940 |
| 523,316 | Great Britain | July 11, 1940 |
| 593,258 | Great Britain | Oct. 13, 1947 |
| 595,486 | Great Britain | Dec. 5, 1947 |